(No Model.)
T. SHAW.
METHOD OF COOLING CANS OF FRUIT.
No. 264,200. Patented Sept. 12, 1882.
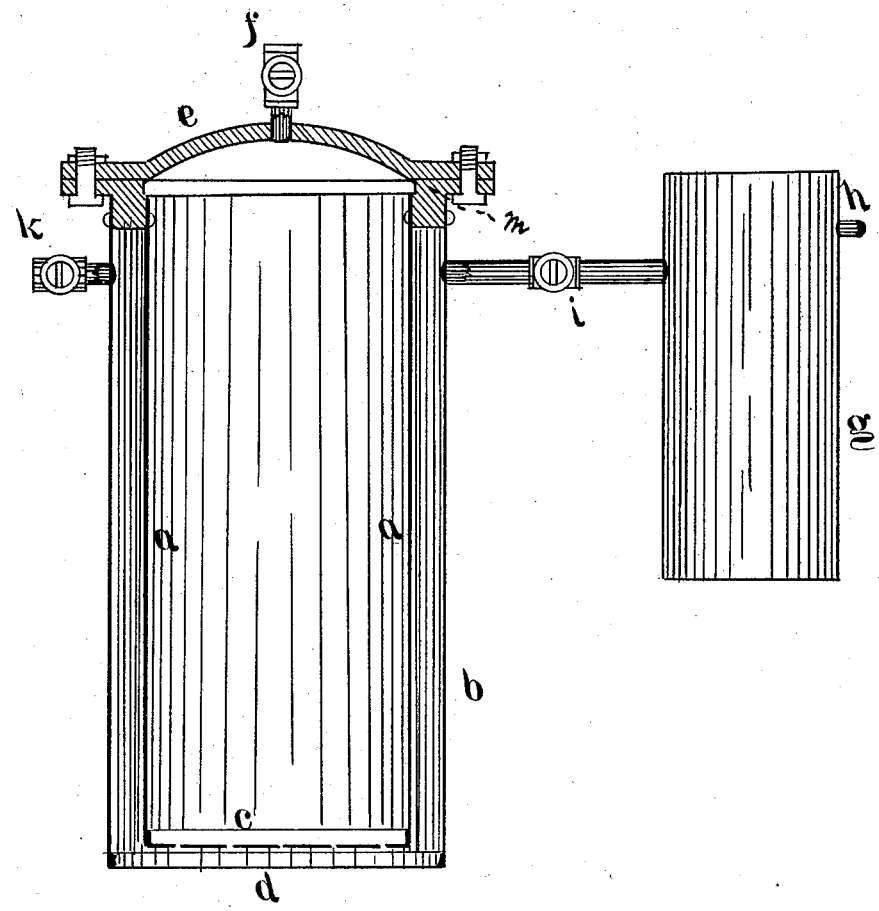
WITNESSES:
INVENTOR
T. Shaw
ATTORNEY

UNITED STATES PATENT OFFICE.

THOMAS SHAW, OF PHILADELPHIA, PENNSYLVANIA.

METHOD OF COOLING CANS OF FRUIT.

SPECIFICATION forming part of Letters Patent No. 264,200, dated September 12, 1882.

Application filed March 10, 1882. (No model.)

*To all whom it may concern:*

Be it known that I, THOMAS SHAW, of the city and county of Philadelphia, and the State of Pennsylvania, have invented a new and improved method of cooling cans containing animal or vegetable substance without injury to the cans or their contents; and I hereby declare the following to be a full, clear, and exact description of the same, reference being had to the accompanying drawing, which forms part of this specification.

In the drawing is shown in vertical section a process kettle or boiler of any suitable material, formed with perforated bottom $c$. Its shell is open at top, and is secured to the flanged collar $m$ about an inch from the outside of shell $a$, and also secured to collar $m$ is placed the shell $b$, the tight bottom of which extends a short distance below the perforated bottom $c$, forming a collecting-chamber for condensed vapor, which is provided with discharge-cock for removing accumulations. $e$ is a strong removable cover, which is bolted or otherwise secured in position on the flange $m$. The valve $f$ is for regulating the exit of vapor, as described. $g$ is a strong metallic reservoir for containing and retaining compressed air. $h$ is the pipe leading to the source of supply, and $i$ is a regulating-valve placed in a suitable pipe connecting the reservoir $g$ with kettle and jacket $a\ b$. $k$ is a regulating-valve placed in the pipe leading to a steam-generator.

The operation is as follows: The cover $e$ having been removed, tightly-closed cans of animal or vegetable substance are placed in kettle $a$ until it is filled, cover $e$ is replaced and secured to flange $m$, valve $i$ is closed, valve $f$ is partially opened, and steam is admitted through valve $k$ into the space between shells $a$ and $b$, from which, through the perforations in bottom $c$, it rises among the cans in kettle $a$, driving before it the air, which escapes through valve $f$. I prefer to use steam at a pressure of about sixty pounds to the square inch, which enables me to maintain a pressure of from one to twenty pounds in the kettle, which is to be continued from twenty to fifty minutes, according to the material being operated upon. The compressed air may be used at any desired tension above that of the atmosphere. The greater the pressure of the air used the more rapid will be the absorption of heat and consequent cooling of the cans and contents. By the use of an ordinary gage the pressure within the kettle, and consequently the heat applied to the cans, is readily observed, and is to be regulated by the operator by means of valve $k$. When sufficient amount of heat has been applied to the cans the supply of steam is stopped, and before the pressure is materially lessened compressed air of about equal or higher pressure to that of the steam is admitted between the shells, and, passing up through perforated bottom $c$, it replaces the steam, and, being allowed to expand somewhat by its property of absorbing heat during expansion, it rapidly cools the cans, and while maintaining a sufficient pressure prevents them from being distorted or injured by expansion of the steam and other gases generated inside them by the heat previously applied. The heated air is being constantly driven out through valve $f$ by the supply from reservoir $g$, and with the assistance of the steam-gage the supply is regulated by valve $i$. The accumulations of condensation are discharged through a suitable cock located in the bottom $d$.

By the use of my improvement the cans are heated and cooled in the same vessel, thus avoiding the frequent handling necessary when the cooling is by immersion in tanks of water, and saving the cost of the immense amount of fresh water previously used, as well as the time consumed in transferring from one vessel to another, during which transfer the cans being particularly exposed to the risk of bulging and bursting by the steam and other gases generated inside them.

It will be noted that the air is admitted at about the same pressure as the steam. Consequently the tendency of the liquid contents of the vessels to rupture the latter is averted. The air is also expelled as it becomes heated, thus rapidly conveying away the heat and cooling the cans and contents.

I do not here claim the apparatus shown and described, as it may form the subject of a separate application.

What I claim, and desire to secure by Letters Patent, is—

1. The process of heating and cooling canned articles, the same consisting in first placing the filled cans in a closed vessel, admitting steam thereto under pressure until the contents are cooked, then cutting off the steam and passing air under pressure into the vessel, and then passing the air through the vessel, gradually reducing the pressure until the cans and contents are cooled, substantially as set forth.

2. The herein-described method of cooling cans of animal or vegetable matter under pressure by surrounding the cans with compressed air and permitting the same to expand in contact therewith, and then escape, as described.

THOMAS SHAW.

Witnesses:
WM. F. GIRIN,
WM. GARWOOD.